United States Patent
Fukui et al.

(10) Patent No.: US 7,471,624 B2
(45) Date of Patent: Dec. 30, 2008

(54) LOOP CONNECTION DETECTING METHOD AND DEVICE

(75) Inventors: Satoshi Fukui, Yokohama (JP); Kaoru Shimamoto, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 469 days.

(21) Appl. No.: 11/017,881

(22) Filed: Dec. 22, 2004

(65) Prior Publication Data
US 2006/0072460 A1    Apr. 6, 2006

(30) Foreign Application Priority Data
Sep. 29, 2004    (JP) .............................. 2004-283692

(51) Int. Cl.
G01R 31/08 (2006.01)
G06F 11/00 (2006.01)
G08C 15/00 (2006.01)
H04J 1/16 (2006.01)
H04J 3/14 (2006.01)
H04L 1/00 (2006.01)
H04L 12/26 (2006.01)

(52) U.S. Cl. ....................................... 370/222; 370/235

(58) Field of Classification Search ................. 370/235, 370/222
See application file for complete search history.

(56) References Cited

U.S. PATENT DOCUMENTS

| 2005/0063311 A1* | 3/2005 | Sekiguchi | ............... 370/241 |
| 2005/0076140 A1* | 4/2005 | Fung | ............... 709/245 |
| 2005/0220036 A1* | 10/2005 | Sugitani et al. | ............... 370/252 |

FOREIGN PATENT DOCUMENTS

| JP | 2001-77839 | 3/2001 |
| JP | 2002-261785 | 9/2002 |

* cited by examiner

*Primary Examiner*—Seema S Rao
*Assistant Examiner*—Jianye Wu
(74) *Attorney, Agent, or Firm*—Hanify & King, P.C.

(57) ABSTRACT

In an access portion of a LAN, traffic of a received packet is detected, whether or not the traffic exceeds a predetermined threshold is determined, packet information specific to the received packet is acquired when it is determined that the traffic exceeds the threshold, and an occurrence of a loop connection is determined when the packet information acquired is compared with packet information previously held and a number of conformity thereof amounts to a predetermined number within a predetermined time.

10 Claims, 8 Drawing Sheets

PRIOR ART

LOOP CONNECTION DETECTING METHOD AND DEVICE

BACKGROUND OF THE INVENTION

1. Field of the Invention

The present invention relates to a loop connection detecting method and device, and in particular to a loop connection detecting method and device which detect a loop on a network to halt a packet transfer.

2. Description of the Related Art

Figure 6:
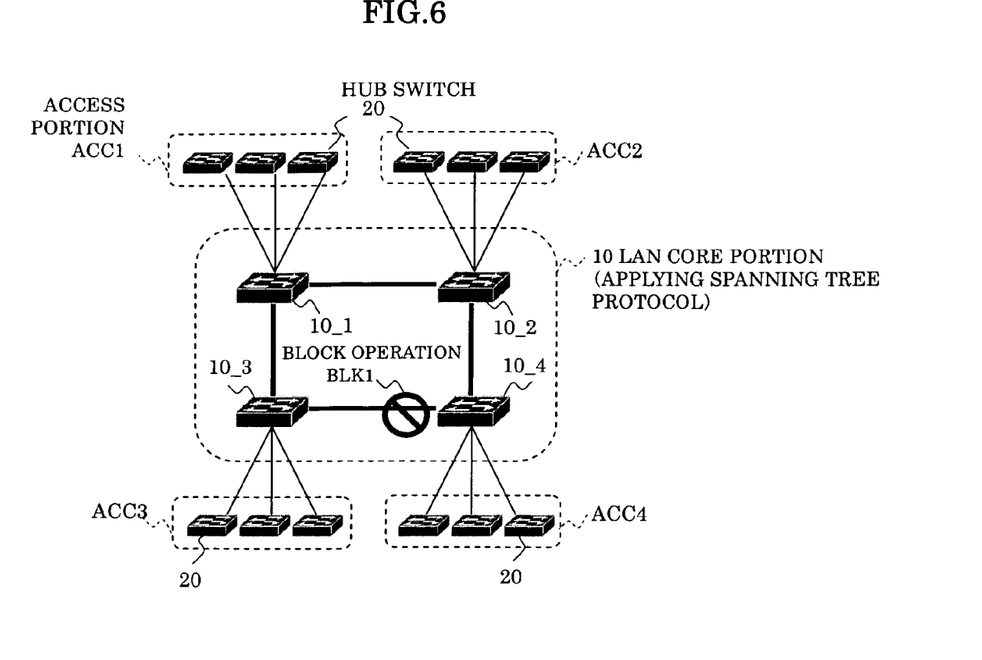
FIG. 6 is a diagram showing an arrangement of a general LAN.

FIG. 6 shows an arrangement of a generally-known LAN (Local Area Network), which is composed of a core portion 10 and access portions ACC1-ACC4. It is to be noted that the access portions ACC1-ACC4 are respectively composed of hub switches 20 (collectively represented), which are connected to terminals (not shown). As means for improving availability of this LAN, LAN switches 10_1-10_4 provided in the core portion 10 are connected e.g. as shown in FIG. 6; the switches 10_1 and 10_2, the switches 10_2 and 10_4, the switches 10_4 and 10_3, and the switches 10_3 and 10_1 are respectively interconnected. This connection makes paths between the LAN switches redundant. In this case, a spanning tree protocol (STP) in conformity with IEEE802.1d is applied to the core portion 10.

Namely, when a loop connection state is detected in the output port of the LAN switch 10_4 in the example of FIG. 6, the spanning tree protocol performs a packet discard and a packet transfer halt by a block operation BLK1 to the output port.

Figure 7:
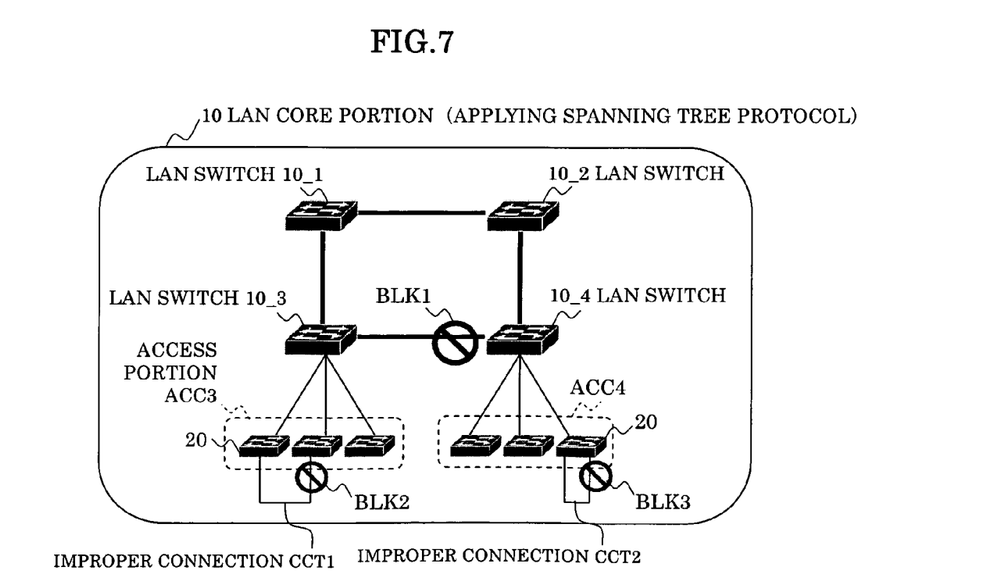
FIG. 7 is a diagram showing an example of an improper connection in the case where a spanning tree protocol is applied to entire core portion and access portion of a LAN.

If such a spanning tree protocol is applied not only to the core portion 10 of the LAN but also to both of the access portions ACC3 and ACC 4 (access portions ACC1 and ACC2 are omitted for simplifying the figure) as shown in FIG. 7, block operations BLK2 and BLK3 are respectively performed based on the spanning tree protocol when an improper (error) connection CCT1 is made between two switches 20 in e.g. the access portion ACC3 to cause a loop state, or when a loop state occurs as a result of an improper connection CCT2 being made in a single hub switch 20 of the access portion ACC4. Thus, a loop in an adequate port can be automatically excluded.

However, in the above-mentioned access portions in the LAN, (1) Since communications are disabled for fifty seconds from a link-up (operation after power-on) due to a characteristic of the spanning tree protocol, a DHCP function of a terminal is blocked and an IP address can not be acquired:
(2) On the grounds that the spanning tree protocol function is not originally required since no redundant arrangement is adopted, services in which the access portions are not included in the core portion 10 so that the spanning tree protocol function is not applied thereto, as shown in FIG. 6, are performed in many cases.

Figure 8:
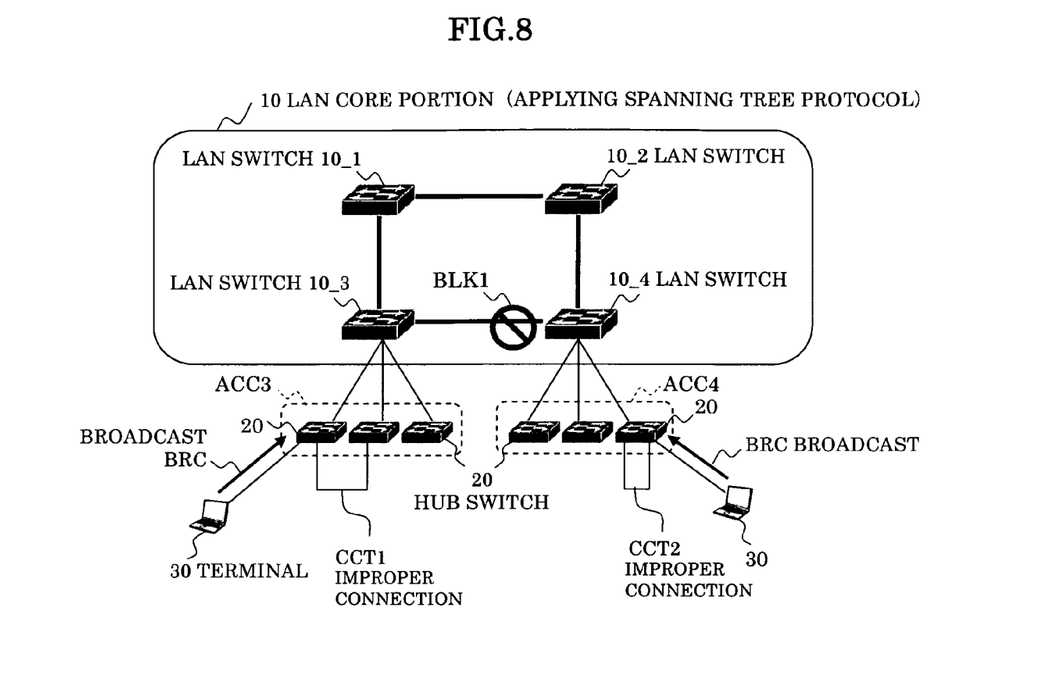
FIG. 8 is a diagram illustrating a state in which an improper connection is made in the state of FIG. 6 and broadcast packets are flowed.
Figure 9:
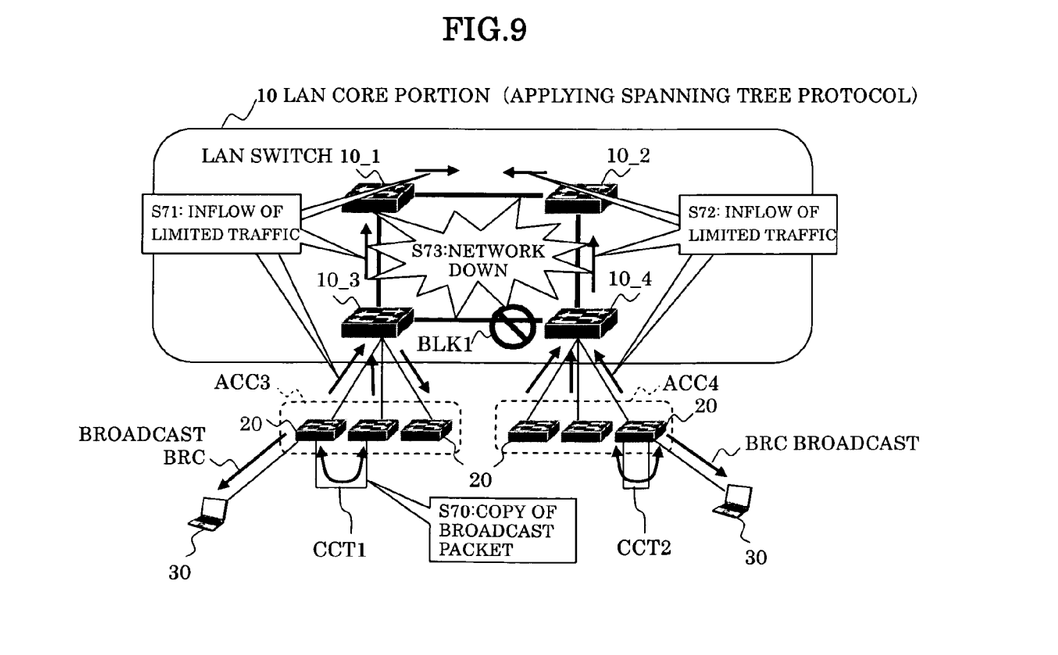
FIG. 9 is a diagram illustrating a state in which a meltdown of a network occurs in the state shown in FIG. 8.

Thus, in case the spanning tree protocol is not applied to the access portions, when the improper connection CCT1 occurs between two hub switches 20 in the access portion ACC3 or the improper connection CCT2 occurs in a single hub switch 20 in the access portion ACC4 in the same way as the example of FIG. 7, loops are formed in the access portions ACC3 and ACC4 as shown in FIG. 8. Therefore, when a broadcast BRC of a packet is performed from a terminal 30 connected to the hub switch 20, the packet is endlessly copied by the broadcast BRC as shown in FIG. 9 (at step S70), and the traffic is flowed in up to the limit (at steps S71 and S72) by the copying, which makes the traffic of the entire core portion 10 of the LAN rapidly increase and causes a LAN to be meltdown (at steps S73).

On the other hand, as a method for detecting a loop connection, there is a method of detecting and releasing a loop occurrence in a LAN using a spanning tree protocol which includes a step of transmitting a loop detecting test frame within the LAN from a single relay device in the LAN using the spanning tree protocol, a step of detecting whether or not the loop detecting test frame is returned to the relay device which has transmitted the loop detecting test frame after circulating a loop transmission line to be received, and a step of determining an occurrence of a loop transmission path when the loop detecting test frame is returned to the relay device to be received, and disconnecting a connection port which has received the loop detecting frame (see e.g. patent document 1).

Furthermore, there is a serial bus processing method by which a loop connection composed within a serial bus is detected, a random time is set according to the number of ports which can not be recognized upon detection of the loop connection, and a port is invalidated when the random time elapses (see e.g. patent document 2).

Moreover, there is a serial bus network device comprising a 1394 input/output port connecting to a 1394 cable, a physical layer processing an electric signal transmitted to the 1394 input/output port, a port switch connected to the 1394 input/output port and opening/closing the input/output port, and a controller controlling opening/closing of the port switch (see e.g. patent document 3).

[Patent Document 1]
Japanese Patent Application Laid-open No. 2003-9118
[Patent Document 2]
Japanese Patent Application Laid-open No. 2002-261785
[Patent Document 3]
Japanese Patent Application Laid-open No. 2001-77839

Figure 10A:
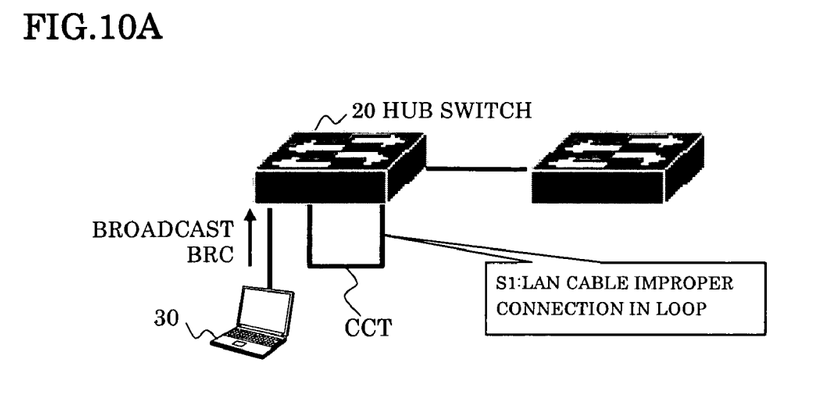
FIGS. 10A and 10B are diagrams illustrating a prior art problem summarized.
Figure 10B:
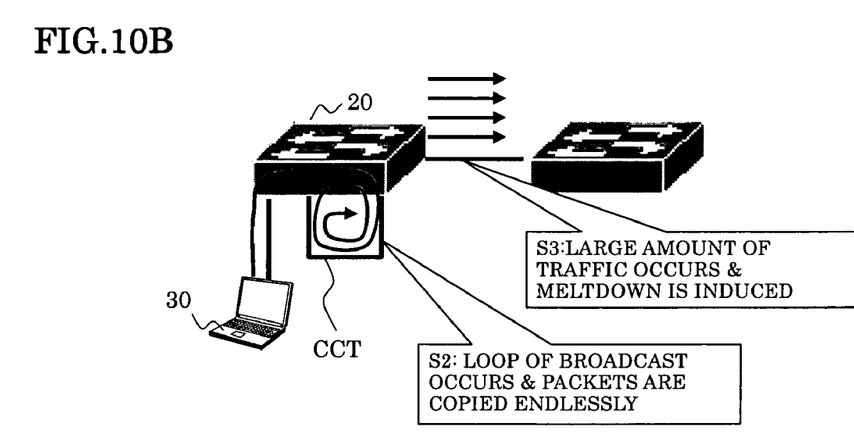

As mentioned above, the spanning tree protocol function is not applied to the hub switches or the like composing the access portion in the LAN in many cases. If the hub switch 20 makes the improper connection CCT (at step S1), as shown in FIG. 10A, in a state in which the spanning tree protocol function is not applied, and if packets are flowed into the hub switch 20 from the terminal 30 by the broadcast BRC, a large amount of traffic occurs and occupies the band.

As a normal operation, every time the hub switch 20 receives a broadcast packet, the hub switch 20 copies the packet to be transmitted to all of the ports. Therefore, if the looped LAN connection CCT is made as shown in FIG. 10A, a large amount of broadcast packets are endlessly copied within the loop connection CCT, which leads to an occurrence of a limited traffic (at step S2).

In this state, the network is filled with the endlessly copied packets and normal communications are disabled, which causes a meltdown of the network (at step S3).

Also, once such a meltdown occurs, since it is difficult to find the place of the loop connection or the like, there is a problem that tracking down takes time. Therefore, it is required to prevent the meltdown.

SUMMARY OF THE INVENTION

It is accordingly an object of the present invention to provide a loop connection detecting method and device which detect a loop connection in an access portion in a LAN to prevent a network down.

In order to achieve the above-mentioned object, a loop connection detecting method according to the present invention comprises: a first step of detecting traffic of a received packet; a second step of determining whether or not the traffic exceeds a predetermined threshold; a third step of acquiring packet information specific to the received packet when the second step determines that the traffic exceeds the threshold; and a fourth step of determining that a loop connection has occurred when the packet information acquired at the third step amounts to a predetermined number within a predetermined time.

Figure 1A:
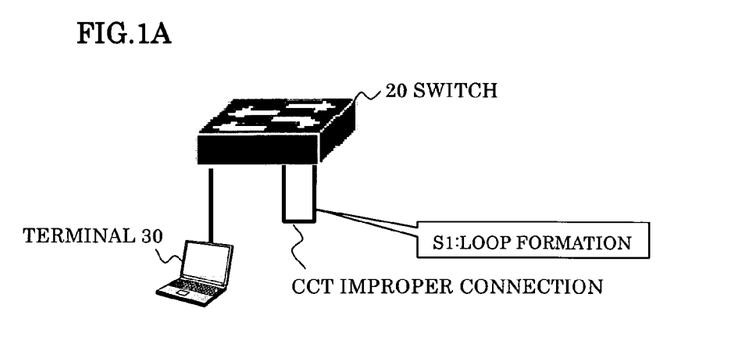
FIGS. 1A-1D are diagrams illustrating a principle of a loop connection detecting method and device according to the present invention.
Figure 1B:
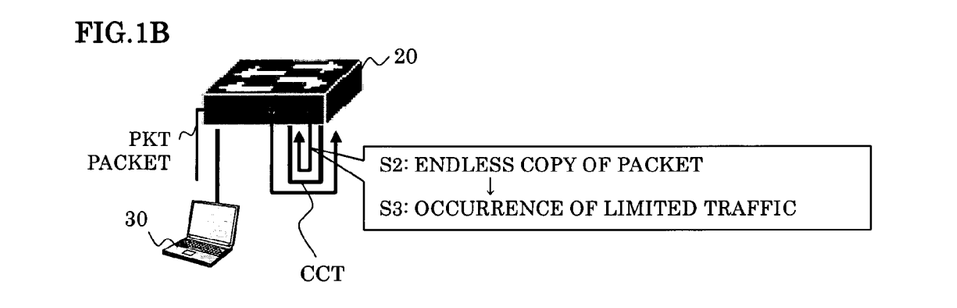

This will be described by referring to FIGS. 1A-1D. As shown in FIG. 1A, when an improper connection CCT is made in e.g. a hub switch 20, and a loop is formed as a result of the improper connection (at step S1), a broadcast packet PKT is endlessly copied through the improper connection CCT, as shown in FIG. 1B (at step S2), which causes limited traffic (at step S3). This is a problem in the conventional technology as described above.

Figure 1C:
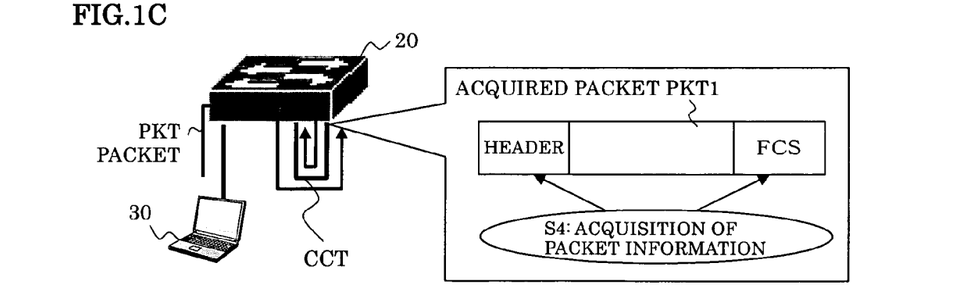

Therefore, in the present invention, traffic of a received packet is detected at the first step, a threshold (e.g. equal to or more than 80% of LAN utilization: variable by user) for the traffic is set, and whether or not the traffic has exceeded the threshold (value) is determined at the second step. As a result, when it is determined that the traffic has exceeded the threshold, packet information PCK1 specific to the received packet is acquired as shown in FIG. 1C (at step S4).

Figure 1D:
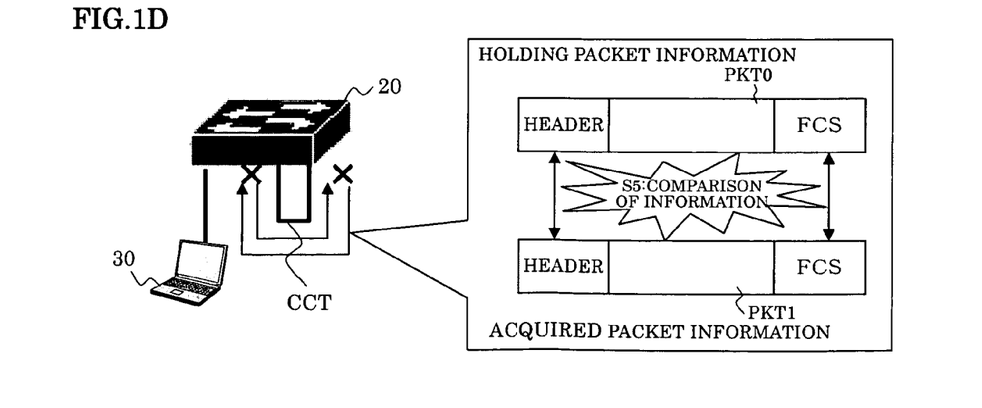

At the fourth step, the packet information PCK1 acquired at the above-mentioned third step is compared with packet information PKT0 previously held as shown in FIG. 1D (at step S5). When the information PCK1 successively coincides with the information PKT0 a predetermined number of times within a predetermined time, it is determined that the loop state has occurred at the access portion in the LAN.

The method of the present invention may further comprise a fifth step of prohibiting a transfer of the received packet when the loop connection occurrence is determined at the above-mentioned fourth step.

Also, the method of the present invention may further comprise a sixth step of generating an alarm when the loop connection occurrence is determined at the above-mentioned fourth step.

Furthermore, the above-mentioned third step may include a step of holding pieces of packet information, and the fourth step may include a step of detecting the predetermined number of same packet information from among the pieces of packet information held within the predetermined time.

A loop connection detecting device according to the present invention for realizing the above-mentioned loop connection detecting method comprises: a first means detecting traffic of a received packet; a second means determining whether or not the traffic exceeds a predetermined threshold; a third means acquiring packet information specific to the received packet when the second means determines that the traffic exceeds the threshold; and a fourth means determining that a loop connection has occurred when the packet information acquired by the third means amounts to a predetermined number within a predetermined time.

The device of the present invention may further comprise a fifth means prohibiting a transfer of the received packet when the loop connection occurrence is determined by the above-mentioned fourth means.

Also, the device of the present invention may further comprise a sixth means generating an alarm when the loop connection occurrence is determined by the above-mentioned fourth means.

Furthermore, the above-mentioned third means may include a means holding pieces of specific information, and the fourth means may include a means detecting the predetermined number of same packet information from among the pieces of packet information held within the predetermined time.

It is to be noted that as the above-mentioned packet information, a header and a frame check sequence (FCS) of a packet can be used.

Figure 2A:
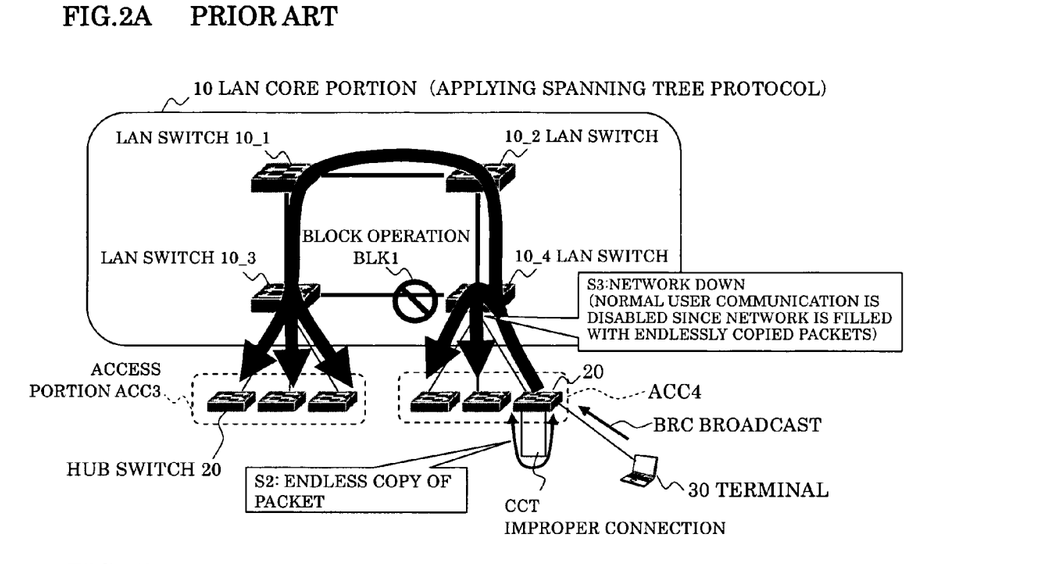
FIGS. 2A and 2B are diagrams illustrating an effect of a loop connection detecting method and device according to the present invention.
Figure 2B:
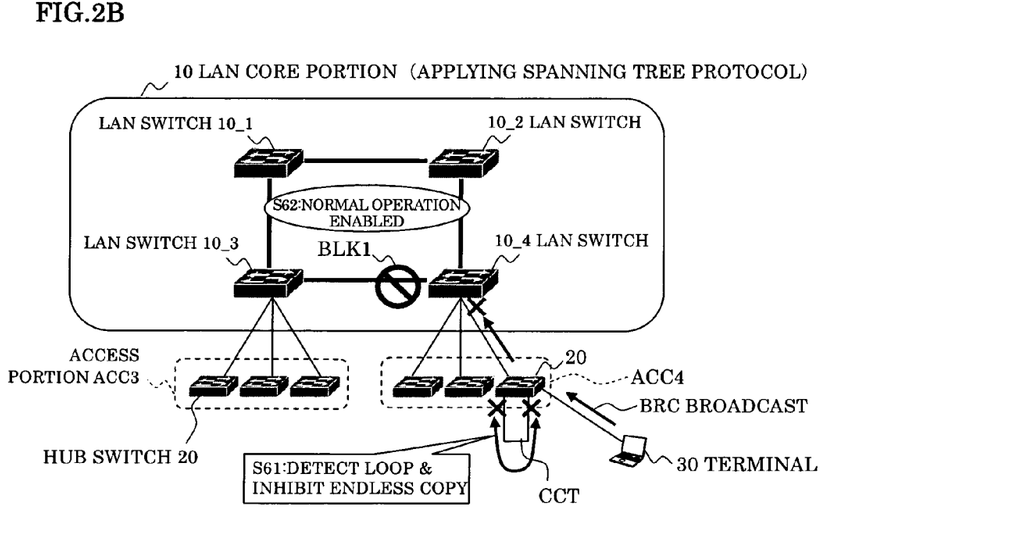

FIGS. 2A and 2B show a comparison between the present invention and the prior art example. When the improper connection CCT is made at the hub switch 20 in the access portion ACC4 in the prior art example shown in FIG. 2A, an endless copy of packets occurs (at step S2), resulting in a network down that is a state in which a network is filled with packets copied endlessly and normal users' communications are disabled (at step S3).

On the other hand, when it is detected that the same packets are flowing in the network with much traffic to which the present invention is applied as shown in FIG. 2B, the occurrence of the loop connection CCT is determined so that the packet discard and a transfer halt are performed (at step S61).

Accordingly, since an abnormally high traffic state accompanied by the occurrence of the loop connection can be avoided, or its range can be minimized, the entire network down can be avoided, and the core portion 10 can be normally operated (at step S62). Also, the present invention enables the network loop occurrence to be easily specified and contributes to the reduction of the network downtime up to a complete recovery.

BRIEF DESCRIPTION OF THE DRAWINGS

The above and other objects and advantages of the invention will be apparent upon consideration of the following detailed description, taken in conjunction with the accompanying drawings, in which the reference numerals refer to like parts throughout and in which.

DESCRIPTION OF THE EMBODIMENTS

Embodiment of Arrangement

Figure 3:
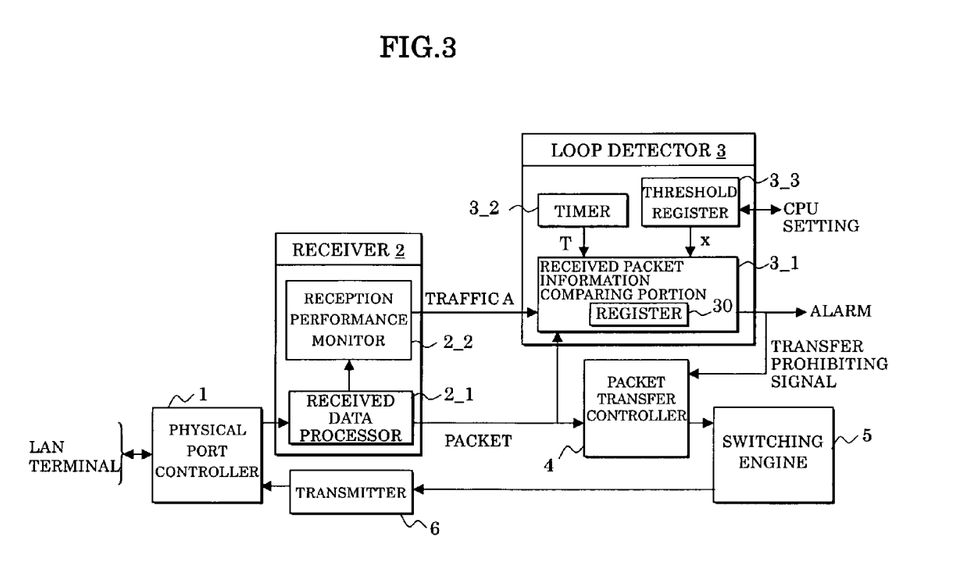
FIG. 3 is a block diagram showing an arrangement of a device which realizes a loop connection detecting method according to the present invention.

FIG. 3 shows an arrangement of a device realizing a loop connection detecting method according to the present invention. In FIG. 3, a physical port controller 1 is connected to a receiver 2 and a LAN or a terminal. The receiver 2 is composed of a received data processor 2_1 and a reception performance monitor 2_2. A received packet processed by the received data processor 2_1 is transmitted to a loop detector 3 and a packet transfer controller 4. Also, the reception performance monitor 2_2 monitors traffic of the received packet to be provided to the loop detector 3.

The loop detector 3 is composed of a received packet information comparing portion 3_1, a timer 3_2, and a threshold register 3_3, which are connected so that traffic A from the reception performance monitor 2_2 may be transmitted to the received packet information comparing portion 3_1. The received packet information comparing portion 3_1 includes a register 30, and simultaneously inputs the traffic A and the packet from the received data processor 2_1. Also, the received packet information comparing portion 3_1 is connected to provide a transfer prohibiting signal to a packet transfer controller 4.

The packet transfer controller 4 is connected to a switching engine 5, which is connected to a transmitter 6. The transmitter 6 is connected to the physical port controller 1. It is to be noted that the threshold register 3_3 in the loop detector 3 can be set variably by an external CPU or the like. Also, the switching engine 5 is connected to receive the output signal of the packet transfer controller 4 of each loop connection detecting device.

Operational Embodiment (1)

Figure 4:
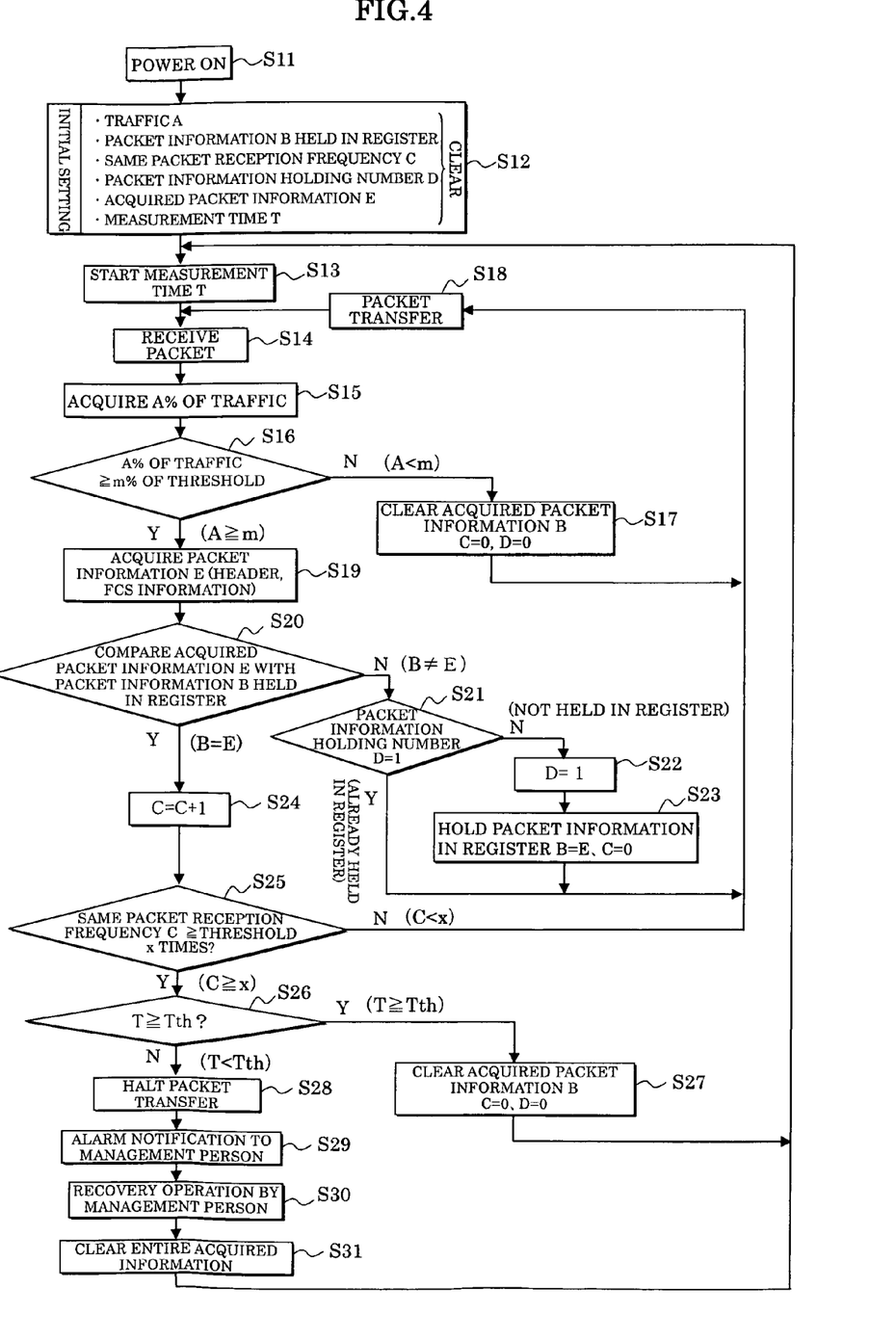
FIG. 4 is a flowchart showing an operational embodiment (1) by an arrangement of the present invention shown in FIG. 3.

FIG. 4 shows an operational embodiment (1) of the loop connection detecting device according to the present invention shown in FIG. 3, specifically dealing with a case where the register 30 provided in the received packet information comparing portion 3_1 is single.

When the power is firstly turned on (at step S11), an initial setting is made (at step S12). At this step, traffic A described later, packet information B held in the register, a same packet reception frequency C, a packet information holding number D, acquired packet information E and a measurement time T of the timer 3_2 are respectively cleared.

Then, the measurement of the timer 3_2 is started (at step S13), and the receiver 2 receives a packet in the received data processor 2_1 through the physical port controller 1 (at step S14). Based on the processing result at the received data processor 2_1, the reception performance monitor 2_2 calculates the traffic A [%] of the received packet based on well-known technologies (at step S15).

The received packet information comparing portion 3_1 in the loop detector 3 having received the traffic A compares a threshold "m" set in the threshold register 3_3 from the CPU or the like with the traffic A (at step S16). When it is found that the result is A<m, the acquired packet information B is cleared, and the same packet reception frequency C and the packet information holding number D are both reset to "0" (at step S17). Since the packet transfer prohibiting signal is not provided to the packet transfer controller 4 in this state, the packet is transferred from the physical port controller 1 through the packet transfer controller 4, the switching engine 5 and the transmitter 6 (at step S18).

When it is found that A≧m at step S16, the received packet information comparing portion 3_1 acquires the packet information E (at step S19). The packet information E in this case comprises a header and FCS (Frame Check Sequence) as exemplified in FIG. 1.

Then, the received packet information comparing portion 3_1 compares the packet information E acquired at step S19 with the packet information B held in the register 30 (at step S20). As a result, since the packet information B is firstly cleared so that it is found that B≠E, the process proceeds to step S21, at which whether or not the packet information holding number D=1 is determined. Since the step S21 is for determining whether or not the packet information has been already held in the register 30, so that no information is initially held in the register 30, D is set to 1 at step S22. At step 23, the acquired packet information E is held in the register 30 as the packet information B (B=E), the same packet reception frequency C is cleared to "0", and thereafter the packet transfer is performed (at step S18).

When it is found that B=E at step S20, the same packet reception frequency C is incremented by "1" (at step S24), and the same packet reception frequency C is compared with "x" times set in the threshold register 3_3 (at step S25). As a result, when it is found that C<x, the process proceeds to step S18 so that the packet transfer is performed. When it is found that C≧x, whether or not the measurement time T exceeds a predetermined monitoring period Tth is determined (at step S26). As a result, when it is found that T≧Tth, it is determined that the loop state has not occurred since the measurement time T exceeds the monitoring period Tth. In the same way as step S17, the acquired packet information B is cleared, the same packet reception frequency C as well as the packet information holding number D are both cleared to "0" (at step S27), where the process returns to step S13.

When it is found that T<Tth at step S26, it indicates that the same packets are detected equal to or more than a predetermined frequency "x" within a predetermined time T. Therefore, the received packet information comparing portion 3_1 outputs the transfer prohibiting signal to the packet transfer controller 4 to halt the packet transfer (at step S28). Furthermore, an alarm notification to a management person (at step S29), a recovery operation by the management person (at step S30) are performed, and all of the information acquired is cleared (at step S31), where the process returns to step S13.

Operational Embodiment (2)

Figure 5:
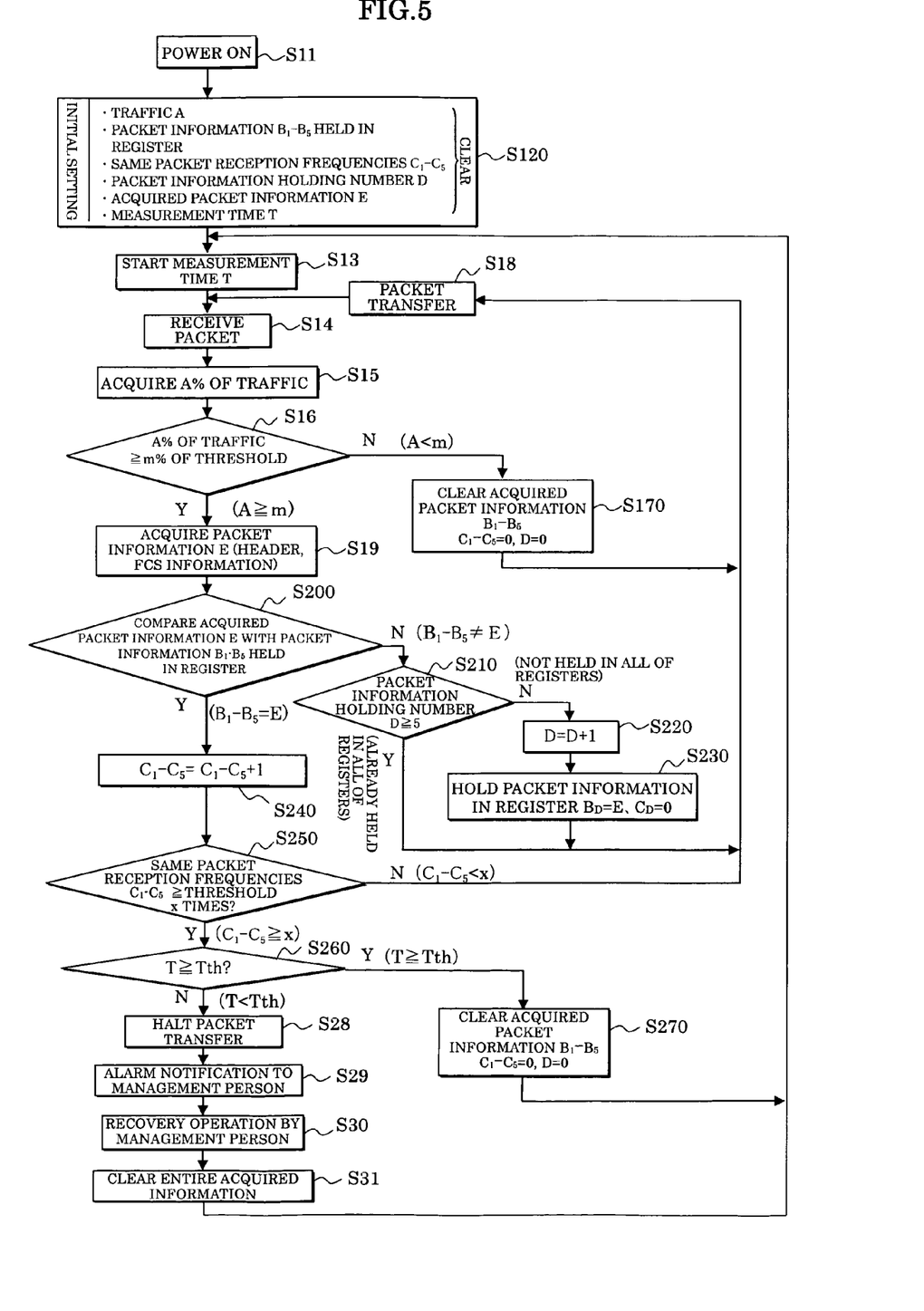
FIG. 5 is a flowchart showing an operational embodiment (2) by an arrangement of the present invention shown in FIG. 3.

The embodiment (2) deals with the case where the register 30 in the received packet information comparing portion 3_1 is composed of five registers 30_1-30_5 (not shown). Therefore, only the steps with the reference numerals to which "0" is added are different from the steps in the operational embodiment (1) shown in FIG. 4.

Namely, at the initial setting (at step S120), the traffic A, pieces of packet information $B_1$-$B_5$ held in the five registers 30_1-30_5, same packet reception frequencies $C_1$-$C_5$ with respect to the registers 30_1-30_5, the packet information holding number D, the acquired packet information E, and the measurement time T of the timer 3_2 are respectively cleared.

Firstly, in the same way as the above-mentioned embodiment (1), when the measurement of the timer 3_2 is started (at step S13), the packet reception (at step S14) and the acquisition of the traffic A [%] (at step S15) are performed. The traffic A is compared with the threshold "m" (at step S16). When the traffic A is less than the threshold "m" (A<m), all of the pieces of packet information $B_1$-$B_5$ acquired of the registers 30_1-30_5 are cleared, the same packet reception frequencies $C_1$-$C_5$ and the packet information holding number D are respectively cleared to "0" (at step S170), and the packet transfer is performed (at step S18).

Also, after the packet information E is acquired at step S19, the acquired packet E is compared with the pieces of packet information $B_1$-$B_5$ held in the registers 30_1-30_5 at step S200. As a result, since no packet information is initially held in any of the registers, all of the pieces of packet information $B_1$-$B_5$ are not equal to the acquired packet information E ($B_1$-$B_5 \neq E$). Therefore, the process proceeds to step S210, so that whether or not the packet information holding number D is equal to or more than "5" is checked. This step S210 is for determining whether or not the packet information is held in all of the five registers 30_1-30_5. Since the packet information is not initially held in any of the registers (D=0), the process proceeds to step S220, at which the packet information holding number D is incremented by "1", and then the acquired packet information E is held in the first register, e.g. the register 30_1 as the packet information $B_D$=$B_1$=E. Also, the corresponding packet reception frequencies $C_D$=$C_1$ are made "0", and the process proceeds to step S18, so that the packet transfer is performed.

When the packet information ($B_1$-$B_5$) held in any of the five registers 30_1-30_5 at step S200 is the same as the acquired packet information E, the same packet reception frequency C is incremented by "1", so that the process proceeds to step S250.

Meanwhile, if $B_1$-$B_5 \neq E$, the packet information holding number D assumes equal to or more than "5" after processes at steps S200, S210, S220, and S230. Therefore, the process directly proceeds to step S18 from step S210.

The same packet reception frequencies $C_1$-$C_5$ with respect to the registers 30_1-30_5 are compared with the threshold "x" times at step S250. In case of $C_1$-$C_5$<x, the packet transfer is performed in the same way as the above-mentioned embodiment (1) (at step S18). When the same packet reception frequencies $C_1$-$C_5$ exceed the threshold ($C_1$-$C_5 \geq x$), the timer T is compared with the monitoring period Tth. When the timer T exceeds the monitoring period Tth (T≧Tth), the pieces of packet information $B_1$-$B_5$ acquired are cleared at step S270, the same packet reception frequencies $C_1$-$C_5$ are cleared to "0", and the packet information holding number D is cleared to "0", where the process returns to step S13.

Meanwhile, when the timer T does not exceed the monitoring time Tth (T<Tth), the packet transfer is halted (at step S28), the alarm notification to the management person (at step S29) and the recovery operation by the management person (at step S30) are performed, and all of the acquired information is cleared, where the process returns to step S13 in the same way as the above-mentioned operational embodiment (1).

Namely, when the same packets are successively received from the beginning, the packet information E is held as the packet information $B_1$ in the register 30_1 within the five registers 30_1-30_5. As a result, since the same packet reception frequency $C_1$ with respect to the register 30_1 exceeds the threshold "x", the loop connection is determined at this point of time. Also, when the same packets are not successively received, the same packets are held in the registers 30_1-30_5 as the pieces of packet information $B_1$-$B_5$ one after another. When the packet information E same as the packet information $B_3$ held in e.g. the register 30_3 arrives "x" times within the predetermined time Tth, the loop connection is determined at this point of time. Namely, when the packets are not successively received, different pieces of information $B_1$-$B_5$ are respectively held in the five registers 30_1-30_5, and when one of them coincides with the acquired packet information E "x" times within the measurement time T, the loop connection is determined.

While the case of one register and the case of five registers are exemplified in the above-mentioned operational embodiments, it is needless to say that a similar arrangement can be composed by various registers.

Also, as for the period of the timer T, the packet number flowing in a full-duplex state of 10 Mbps is largely different from that flowing in a full-duplex state of 100 Mbps. The size of the packet changes depending on an environment such as an application used by a user, and accordingly the packet number flowing in the LAN also changes. Therefore, it is preferable to make the timer setting variable (e.g. 100 msec) depending on a user.

What is claimed is:

1. A loop connection detecting method comprising:
a first step of detecting traffic of a received packet;
a second step of determining whether or not the traffic exceeds a predetermined threshold of network utilization;
a third step of acquiring packet information specific to the received packet, including a header and a frame check sequence of the packet, when the second step determines that the traffic exceeds the threshold; and
a fourth step of determining that a loop connection has occurred when it is determined that the received packet has been received at least a predetermined number of times within a predetermined time using the packet information acquired at the third step.

2. The loop connection detecting method as claimed in claim 1, further comprising a fifth step of prohibiting a transfer of the received packet when the loop connection occurrence is determined at the fourth step.

3. The loop connection detecting method as claimed in claim 1, further comprising a sixth step of generating an alarm when the loop connection occurrence is determined at the fourth step.

4. The loop connection detecting method as claimed in claim 1, wherein the third step includes a step of holding pieces of packet information, and the fourth step includes a step of detecting the predetermined number of same packet information from among the pieces of packet information held within the predetermined time.

5. The loop connection detecting method as claimed in claim 1, wherein the packet information includes a header and a frame check sequence.

6. A loop connection detecting device comprising:
a first means detecting traffic of a received packet;
a second means determining whether or not the traffic exceeds a predetermined threshold of network utilization;
a third means acquiring packet information specific to the received packet, including a header and a frame check sequence of the packet, when the second means determines that the traffic exceeds the threshold; and
a fourth means determining that a loop connection has occurred when it is determined that the received packet has been received at least a predetermined number of times within a predetermined time using the packet information acquired at the third step.

7. The loop connection detecting device as claimed in claim 6, further comprising a fifth means prohibiting a transfer of the received packet when the loop connection occurrence is determined by the fourth means.

8. The loop connection detecting device as claimed in claim 6, further comprising a sixth means generating an alarm when the loop connection occurrence is determined by the fourth means.

9. The loop connection detecting device as claimed in claim 6, wherein the third means includes a means holding pieces of specific information, and the fourth means includes a means detecting the predetermined number of same packet information from among the pieces of packet information held within the predetermined time.

10. The loop connection detecting device as claimed in claim 6, wherein the packet information includes a header and a frame check sequence.

* * * * *